United States Patent [19]

Westwood, III

[11] Patent Number: 4,702,447
[45] Date of Patent: Oct. 27, 1987

[54] CLAMP DEVICE

[76] Inventor: Samuel M. Westwood, III, 2005 Linden St., Bethlehem, Pa. 18017

[21] Appl. No.: 676,108

[22] Filed: Nov. 29, 1984

[51] Int. Cl.[4] ............................................. F16M 13/00
[52] U.S. Cl. ................................ 248/231.5; 24/232 R; 24/241 R; 248/316.5; 403/157
[58] Field of Search ...................... 248/540, 541, 316.5, 248/231.5; 24/232 R, 241 PL, 241 R, 241 PP; 403/157

[56] References Cited

U.S. PATENT DOCUMENTS

| 340,838 | 4/1886 | Walters et al. ..................... 24/232 X |
| 483,963 | 10/1892 | Leger ............................ 248/316.5 X |
| 2,057,980 | 10/1936 | Ringzelli ...................... 248/231.5 X |
| 2,537,322 | 1/1951 | Wanzenberg ...................... 24/136 B |
| 2,543,550 | 2/1951 | Kneeland . |
| 2,589,520 | 3/1952 | Wallenius . |
| 2,824,913 | 2/1958 | Taylor . |
| 2,838,263 | 6/1958 | Drewrys ..................... 248/231.5 X |
| 2,917,800 | 12/1959 | Gee . |
| 3,270,494 | 9/1966 | Holmes ............................. 24/232 X |
| 4,309,052 | 1/1982 | Drayton ..................... 24/241 PP X |
| 4,327,608 | 5/1982 | Keys . |

FOREIGN PATENT DOCUMENTS

| 288756 | 11/1915 | Fed. Rep. of Germany ........ 24/232 |
| 1065482 | 9/1959 | German Democratic Rep. ................................. 248/231.5 |
| 9917 | of 1886 | United Kingdom ................. 24/232 |

Primary Examiner—J. Franklin Foss
Assistant Examiner—David L. Talbott
Attorney, Agent, or Firm—Fleit, Jacobson, Cohn & Price

[57] ABSTRACT

A clamp device for interconnecting two entities, one of which may be a support and the other of which may be an item to be supported with the clamp device including a stem and a plurality of jaws connected to the stem at one end thereof, a hand manipulated nut threaded on the stem for causing the jaws to engage and be connected to one of the two entities and means on the other end of the stem to engage and be connected to the other of the entities. The jaws are constructed in various shapes, sizes, configurations and arrangements with the closing force for the jaws being provided by manual rotational movement of the screw-threaded nut which has a surface engaging with an extension surface on the jaws to move the jaws to entity engaging position and retain them in that position. The other end of the stem has various structures providing connection to the other entity and the stem also includes an aperture in one embodiment to receive and retain a supporting rod for a flag or other similar structure. In another embodiment the stem includes spaced legs with a pin extending therebetween and locked to one of the legs with the pin extending through a grommet or other aperture in the second entity.

17 Claims, 15 Drawing Figures

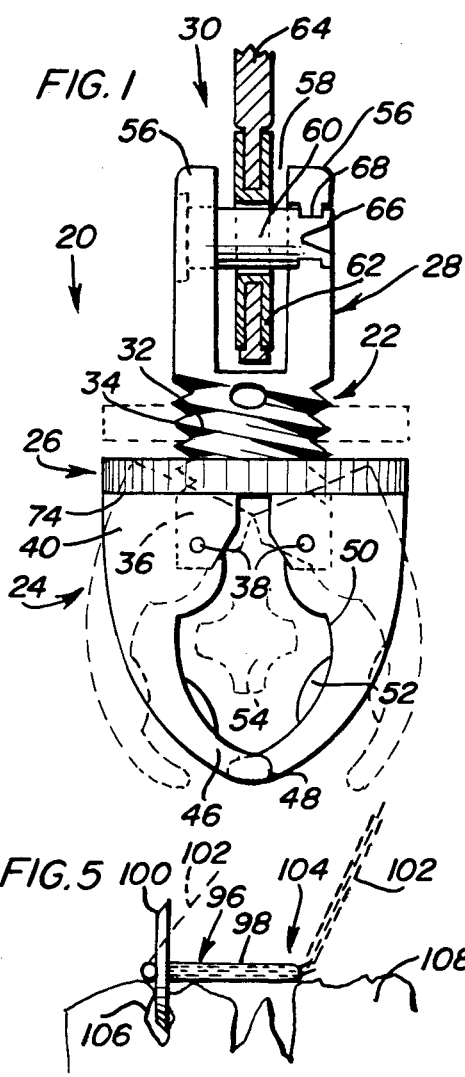
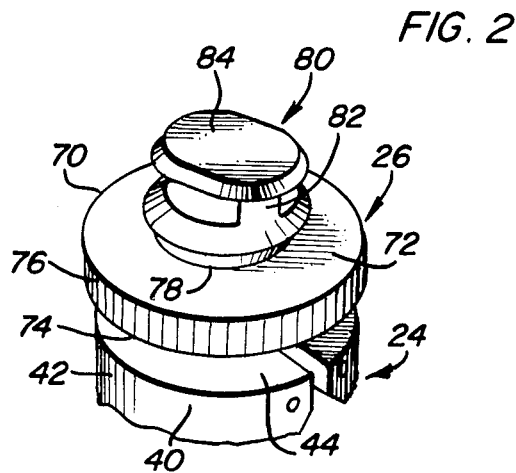
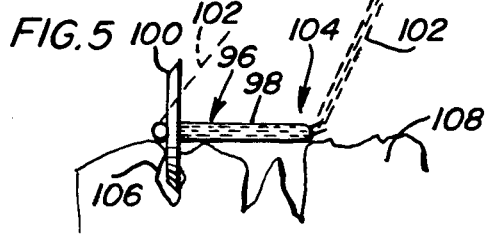
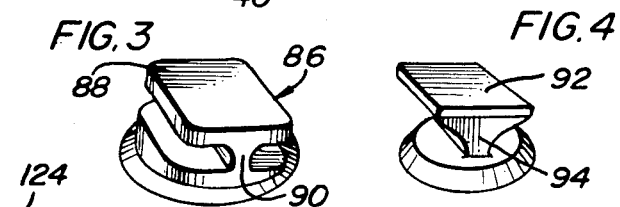
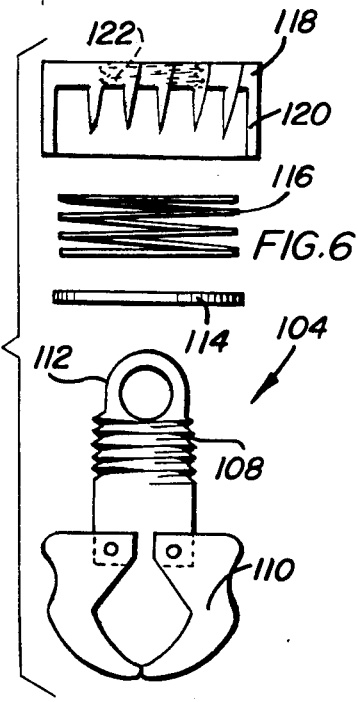
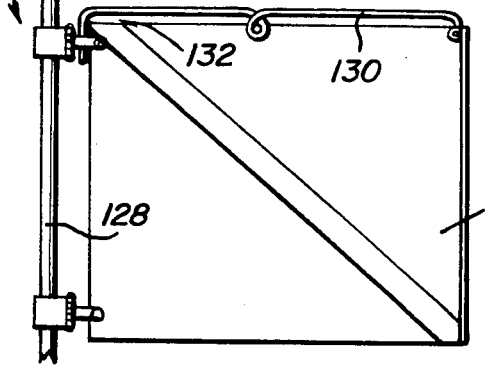
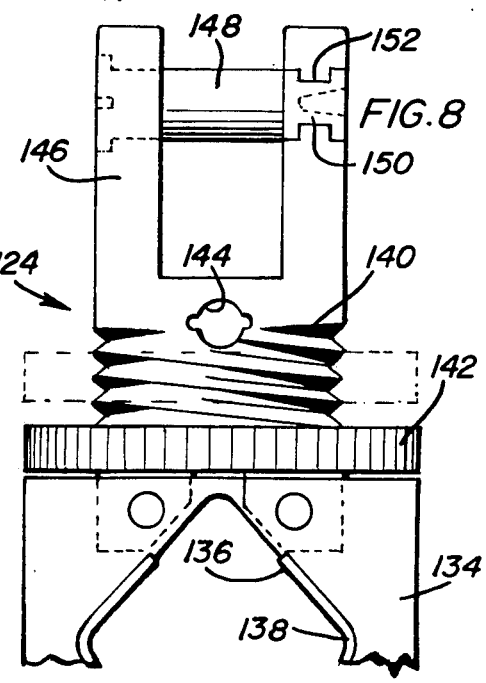

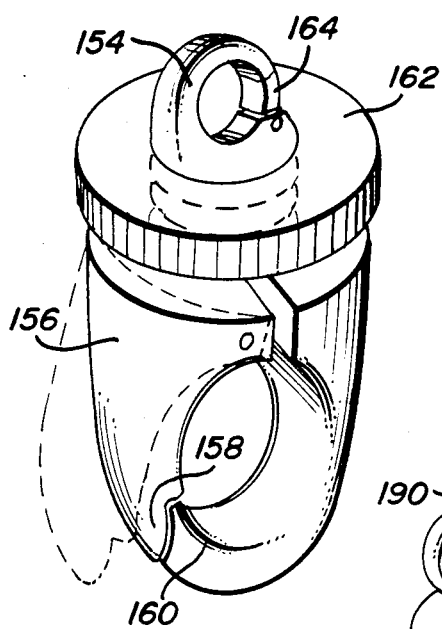
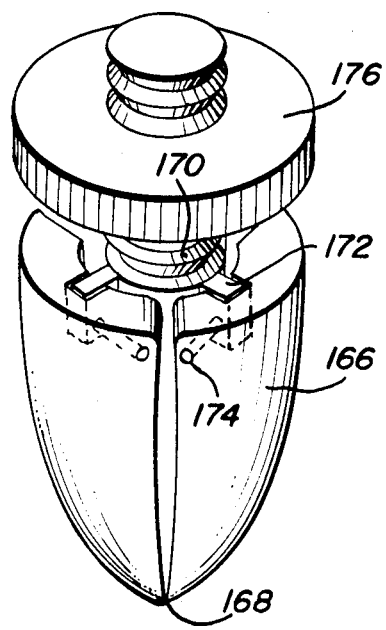
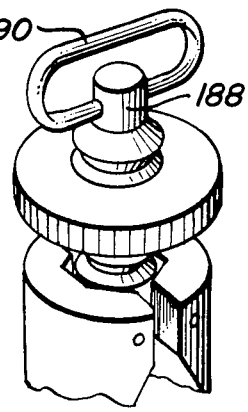
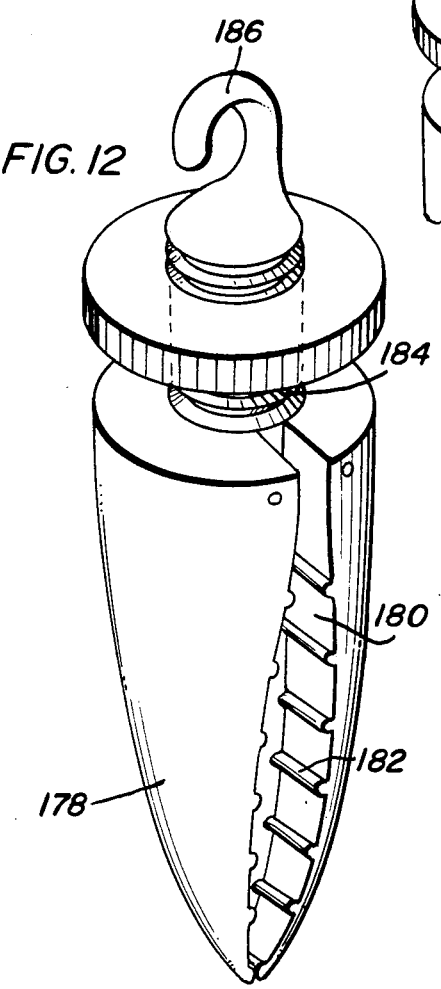
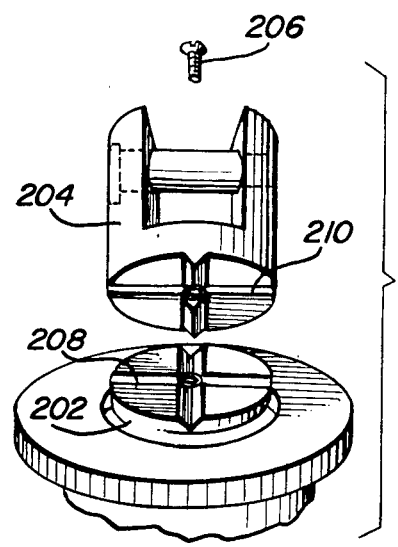
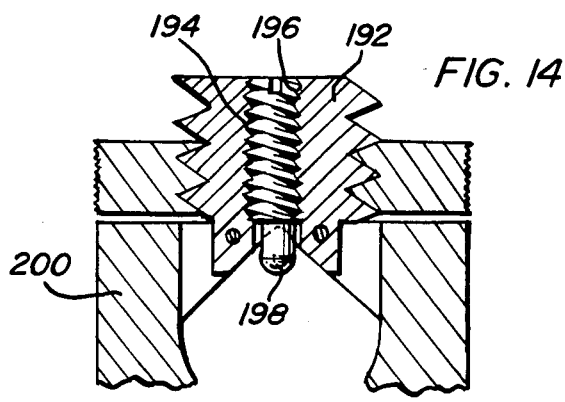

CLAMP DEVICE

BACKGROUND OF THE INVENTION

1. Field of the Invention

The present invention generally relates to a clamp device adapted to clampingly engage items for support or connection of such items to another device or clampingly engage a support or item for connection therewith in which the clamp device is capable of structural variations to adapt it for use with many entities. The clamp device includes a pair of clamping jaws mounted on a threaded stem having a nut threadably mounted thereon for engagement with a portion of the jaws to force the jaws towards each other for clamping engagement with a support, item or article engaged thereby.

2. Description of Related Art

Various types of clamping devices are well known including those with pivotal jaws. Exemplary of the development of the prior art relating to clamp devices are the following U.S. patents:

| | |
|---|---|
| 2,543,550 | 2/27/51 |
| 2,824,913 | 2/25/58 |
| 2,917,800 | 12/22/59 |
| 2,589,520 | 3/18/52 |
| 4,327,608 | 5/4/82 |

SUMMARY OF THE INVENTION

An object of the present invention is to provide a clamp device which basically includes a pair of clamp jaws pivotally attached to a threaded stem and a threaded nut to exert pressure on the jaws to force them into clamping engagement with an entity disposed between the jaws.

Another object of the invention is to provide a clamp device in which the shape, size, configuration and the interior clamping surfaces thereof may be varied for enabling the clamp device to be used for various purposes.

A further object of the invention is to provide a clamp device in which the stem of the clamp device is constructed with different configurations and structural variations which adapt the clamp device for various uses and purposes.

Still another object of the invention is to provide a clamp device in which the clamping nut is directly engaged with laterally extending surfaces on the clamping jaws which are generally perpendicular to the stem when in clamping relation to an entity between the jaws with the nut including the optional use of a spring interposed between the nut and the surfaces on the jaws to spring-bias the jaws towards each other to enable them to be manually moved apart upon exertion of lateral pressure sufficient to compress the spring.

A still further object of the invention is to provide a clamp device in accordance with the preceding objects which is simple in construction, easy to manipulate, dependable in operation and capable of many and varied uses.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of one embodiment of the clamp device of the present invention.

FIG. 2 is a fragmental perspective view of the upper end of the clamp device illustrating a variation in the manner of connecting the clamp device to an entity.

FIG. 3 is a fragmental perspective view of another embodiment of connector utilized on the clamp device.

FIG. 4 is a fragmental perspective view illustrating still another embodiment of the connecting device used on the clamping device.

FIG. 5 is a fragmental elevational view illustrating the use of the present invention with an anchor and chain.

FIG. 6 is an exploded group side elevation view of the embodiment of the clamp device used with the anchor in FIG. 5;

FIG. 7 is a fragmental elevational view illustrating the clamp device of the present invention for supporting a flag by engagement with the eyelets and providing a support for a flag supporting rod.

FIG. 8 is an elevational view of the clamp device utilized in FIG. 7.

FIG. 9 is a fragmental sectional view illustrating the connection between the pin and clamp body or stem.

FIGS. 10–13 are perspective views illustrating further variations in the clamp device of the present invention.

FIG. 14 is a detailed fragmental sectional view of the stem, nut and jaws with an adjustment pin associated therewith.

FIG. 15 is an exploded group perspective view illustrating an embodiment of the clamp device illustrating a structure to enable adjustment about a longitudinal axis.

DESCRIPTION OF THE PREFERRED EMBODIMENTS

FIG. 1 of the drawings illustrates one embodiment of the clamp device generally designated by reference numeral 20 which includes a stem 22, a pair of jaws 24, a nut 26 and a connector 28 by which the clamp device 20 can be connected to an article or item to be supported, a support itself or any other entity generally designated by numeral 30.

As illustrated, the stem 22 includes a cylindrical body 32 that is externally threaded at 34 which is provided with a pair of depending or axially extending lugs 36 to which the jaws 24 are pivotally connected by pivot pins 38 for pivotal movement of the jaws 24 about transverse, parallel axes.

Each of the jaws 24 includes an elongated body 40 having a curved outer surface 42 and a generally planar end surface 44 in perpendicular relation to the outer curved surface 42. The body 40 curves inwardly and is thinner at its lower end as indicated by numeral 46 and terminates in inwardly projecting fingers 48 which overlap and interdigitate when the lower ends of the jaws 46 are brought into engaging and adjacent relationship. The interior edge of the jaw bodies 40 are spaced apart at their upper ends and disposed in perpendicular relation to the planar end surface 44 and the lower portion of the interior surface of the jaws 24 include a recess 50 provided with curved ribs 52 for clamping engagement with an article to be supported or a support structure or any other entity as designated by numeral 54 with the projecting ribs 52 adapting to engage various irregular surfaces, flexible or pliable entities, a cylindrical rod, tubular member or the like for enabling the jaws 24 to effectively clampingly engage the entity 54 at a plurality of points circumferentially spaced about the circumference of the entity 54. It will be appreciated that the dimensional characteristics of the recesses 50, the orientation, shape, size and configuration of the ribs 52 as well as the fingers or projections 48 may vary depending upon the use for which the clamp device is adapted.

The connector 28 is in the form of a pair of legs or furcations 56 oriented in parallel spaced relation to each other and unitary with the body 32 of the stem 22 thereby providing a longitudinally and laterally opening slot-like recess or opening 58 for receiving the entity 30 therebetween. A connecting pin 60 extends between the legs 56 and through a grommet 62 in the entity 30 which may be a thin panel, fabric member, column or the like designated by numeral 64. The pin 60 is headed at one end and provided with an externally grooved and slotted end 66 for rotational locking engagement with a correspondingly slotted and grooved opening 68 in the leg 56 opposite to that receiving the headed end of the pin 60 to enable detachable connection between the entity 30 and the connector 28.

The nut 26 is in the form of a cylindrical body 70 having a flat planar upper surface 72 and a flat planar lower surface 74 and a knurled or otherwise roughened peripheral edge at 76 with the nut including a centrally located internally threaded bore 78 for screw-threaded engagement with the stem body 32. The surfaces 72 and 74 are perpendicular to the longitudinal axis of the stem so that when the surface 74 of the nut engages the planar end surface 44 of the clamp jaws, the lower inwardly extending ends 46 of the clamp jaws will be forced inwardly when the nut 26 is threaded on the stem 22 toward the pivot pins 38 so that the planar surfaces 44 of the jaw bodies 40 will be in alignment with each other and flatly engaged by the surface 74 on the nut 26. Thus, longitudinal threaded movement of the nut 26 on the stem 22 will clamp and unclamp the jaws 24 in relation to the entity 54 with which the jaws are engaged.

FIG. 2 illustrates a variation of the connector designated by numeral 80 in which the stem is provided with a transverse axial flange 82 which terminates in a circular or oval plate 84 spaced from the upper end of the stem. The flange 82 may have parallel surfaces or they may be inwardly curved in a concave manner so that the clamp device illustrated in FIG. 2 can be connected to a channel-shaped track or other anchoring device in which the channel-shaped track has inwardly extending flanges defining an open-ended slot so that the plate 84 can be received internally of the track or anchoring device and the flange 82 extending through the slot in the track or anchor.

FIG. 3 illustrates a similar connector 86 which includes a generally square plate 88 connected to the stem by a transverse, axially extending flange or web 90 while FIG. 4 illustrates a similar connector in which the square plate 92 is connected to the threaded stem by a web or flange 94 of curved V-shaped configuration. The connectors illustrated in FIGS. 2-4 may be provided with circular plates, square plates, rectangular plates or any other desired shape of plates which are spaced from and integrally connected to the threaded stem by flanges with parallel surfaces to provide an I beam configuration or with V-shaped flanges with inclined or inwardly curved surfaces for engagement with tracks, anchoring devices or the like having various configurations to enable interengagement between the connector and the track, anchor, fastener or the like.

FIG. 5 illustrates the use of the clamp device of the present invention in combination with an anchor 96 having a shank 98 and crown or fluke 100 and a rope, chain or other line 102 connected to the crown 100 and extending along the shank 98 and connected to the upper end thereof with the clamp device 104 of the present invention which replaces the normally provided breakable lashing which will give way when a predetermined force is applied to the line 102 so that tension force then can be exerted on the crown or fluke 100 in a manner illustrated in dotted line for disengaging the anchor when it has become locked into a cavity 106 or the like in the surface 108 of a body of water or the like. While it is conventional practice to use a breakaway lashing such as a small line or the like for this purpose, the use of the clamp device 104 enables variation in the force required to disconnect the line 102 from the upper end of the anchor shank 98 so that force is exerted on the crown with the structure of the clamp device being illustrated in FIG. 6 and which includes the threaded stem 108, jaws 110 and connector 112 in the form of a ring. Positioned over the stem 108 is a washer 114 engaging the jaws 110 and a compression coil spring 116 engaging the washer 114. A nut 118 having a depending skirt 120 and a central internally threaded aperture 122 is threaded onto the stem 108 and engages the upper end of the spring 116 with the skirt 120 encompassing or enclosing the spring 116 and the washer 114 when the nut 118 is screw-threaded downwardly toward the jaws 110 which will compress the spring so that the washer 114 will exert pressure on the jaws 110. By constructing the jaws with abutting meeting edges, the clamp device 104 can be connected to the line 102 with a predetermined resistance to movement of the line between the tip ends of the jaws. Thus when the tension on the line 102 exceeds a predetermined force tending to move it to a straight line position, the tip ends of the jaws will move apart by moving the washer inwardly and compressing the spring 116 thus releasing the line from the clamp device and enabling the anchor to be released from a stuck position in the ground formation. By varying the threaded position of the nut 118 on the stem 108, the force required for separating the line 102 from the clamp device 104 can be varied so that normal forces encountered when using the anchor will not separate the line 102 from the clamp device 104. The nut 118 and skirt 120 form a sand guard to prevent entry of sand into the area of the spring and the periphery of the washer 114 may be rounded to closely engage the interior of the skirt 120. In this arrangement, the connector 112 may be connected to the line 102 and the jaws 110 engaged with the anchor shank which is normally provided with a ring at the upper end thereof or the clamp device can be oriented in the opposite direction in which the clamp jaws engage the line 102 and the connector 112 is connected with the ring on the anchor shank. This will eliminate the necessity of replacing and tying the lashing and anchor chain or line to the anchor ring every time the lashing is broken loose. Adjustment of the nut 118 can be accomplished by hand without using tools thereby allowing the conditions under which the anchor chain or line is released to be easily varied.

FIGS. 7-9 illustrate an embodiment of the clamp device 124 adapted to connect a flag 126 to a supporting pole, rope or lanyard 128 with the orientation of the clamp devices 124 being illustrated in FIG. 7 and the structure of this embodiment of the clamp device 124 being illustrated in FIGS. 8 and 9. As illustrated, the flag 126 is provided with a supporting rod 130 connected to the flag 126 in any suitable manner such as by grommets or the rod may be received in a hem at the upper edge of the flag 126. In any event, the rod 130 is provided with a downturned end 132 for supporting engagement with the uppermost of the clamp devices 124 used to support a flag 126. With two or more clamp devices being used to support a single flag depending upon the size characteristics of the flag.

As illustrated in FIG. 8, the clamp device 124 is similar to that illustrated in FIG. 1 except that the clamp jaws 134 have smoothly contoured recesses 136 provided with a lining or coating 138 of resilient material or the like to facilitate gripping engagement of the jaws 134 with the supporting member 128. In this construction, the jaws 134 have straight meeting edges similar to that illustrated in FIG. 6. The stem 140 and nut 142 are similar to that structure disclosed in FIG. 1 with the stem including a hole or opening 144 perpendicular to the axis of the stem 140 for frictionally receiving the downturned end 132 of the flag supporting rod 130. The shape and configuration of the opening 144 may conform with the shape and configuration of the rod 130 and be constructed in a manner that it will frictionally engage and grip the rod to detachably retain it in position in cantilever supported arrangement along or above the top edge of the flag 126 depending upon the connection between the rod 130 and the flag 126.

The stem 140 is externally threaded so that the nut 142 may be moved longitudinally thereon with the opening 144 being disposed above the uppermost position of the nut 142 and being located centrally between the legs 146 of the clamp device 124 which forms the connector between the stem 140 and the flag 126 with a pin 148 extending between and connected to the legs 146 in a manner similar to that illustrated in FIG. 1. FIG. 9 illustrates in more detail the construction of the end 150 on the pin and the aperture 152 on the leg 146 in which the pin 148 is locked in position by rotating the pin 148 a partial turn after insertion through the opening 152. The opening 152 includes projecting lugs having notches therethrough while the end 150 of the pin includes a peripheral groove and a cutout notch to receive the lugs so that the pin can be inserted and twisted into a locked position with the interengaging components being self-locking by frictional engagement. In lieu of this type of engagement, the pin and leg may be provided with a screw-threaded connection as illustrated in more detail in FIG. 15.

This type of flag and support structure is particularly useful while scubba diving with the flag 126 being that flag which is displayed and which should be in the extended position even though there may be no wind. Thus, the clamp device holding the flag has the opening 144 formed in the stem in such a manner as to fixedly accept and receive the supporting rod 130 which holds the flag extended. The pin 148 may be extended through a grommet in the flag and the opening or aperture 152 is channeled and constructed in such a manner to accept the projections on the end 150 of the pin 148 so that when the pin is fully inserted, it can be rotated in either direction 90° with a screwdriver or coin which will allow the projections to seat themselves into the grooved surface of the hole. The legs, being constructed of plastic material, will compress as the pin is turned and will resiliently return to position or into place when the desired locking position is reached.

FIG. 10 illustrates a clamp device with a ring-type connector 154 with only a single pivotal jaw 156 being provided which has a recessed tip end 158 spaced from the longitudinal center of the clamp jaws so that the stationary jaw has a hook-like end 160 to facilitate its ability to quickly secure any animal or object having a ring or hook-type of collar. With the jaw 156 opening to one side, this allows easy entry of a ring and the movable jaw then can be quickly closed around the ring by tightening of the thumbnut 162. The ring-type connector 154 may be of solid construction or it may be provided with a pivotal segment so that a segment of it can be pivoted inwardly to facilitate engagement of the ring 154 onto a supporting line or the like to tether an animal in a dog run or the like with the movable segment of the ring 154 being designated by numeral 164. This type of ring also may be used with the jaw structure illustrated in FIG. 1 to enable a user to quickly join an eyelet, such as part of a flag, with a rope with the jaws of FIG. 1 having the offset protrusions quickly and effectively pinching the rope to provide a snug and secure lock between the flag and the rope with the eyelet being inserted in the ring 154 by displacing the spring-biased segment 164 inwardly until the eyelet is engaged with the ring 154 with the segment 164 then snapping back into closed position.

FIG. 11 illustrates a clamp device having three jaws 166 which close to a point as at 168. In this construction, the externally threaded stem 170 is provided with three projecting lugs 172 to which the jaws 166 are pivotally connected by a pivot pin 174. A thumbnut 176 is threaded on the stem 170 and operates the jaws 166 in the same manner as in the other embodiments of the invention. The stem 170 is illustrated without any connector in FIG. 11 with it being understood that any of the connectors may be employed thereon. The three jaw arrangement is especially useful when lifting or connecting to a tubular member in which the tubular member extends axially of the clamp device generally in alignment with the axis of the stem 170.

The clamp device illustrated in FIG. 12 includes longitudinally elongated jaws 178 having shallow concave facing surfaces 180 with transverse ribs 182 thereon. Also, the stem 184 is provided with a hook-like connector 186 unitary therewith which is especially useful in hanging heavy articles on a line such as rugs or the like on a clothesline with the hook 186 connecting the stem 184 to a supporting structure and the jaws 178 effectively gripping such an item.

FIG. 13 illustrates a clamp device in which the stem is provided with an axial projection 188 having a D-ring 190 pivotally attached thereto for rotatable movement about one leg of the ring 190. This structure is especially useful with cameras, purse handles or the like which enables quick and easy changing of straps such as the shoulder straps on a handbag or the like and may be constructed in sizes compatible with its use.

FIG. 14 illustrates a clamp device in which the stem 192 is internally threaded at 194 to receive a setscrew 196 having an axial rounded extension 198 on its inner end which extends between the lugs on the stem 192 and forms a limit for the pivotal movement of the jaws 200 so that the jaws 200 may be pivoted inwardly to a specific position without the tip ends of the jaws engaging each other or without clampingly engaging an entity between the jaws thereby providing a ring-like structure from the jaws so that the clamp device can move along a supporting rod, rope or otherwise not be frictionally engaged with the supported entity or support entity.

FIG. 15 illustrates an embodiment of the clamp device in which the stem 202 is constructed of sections with the upper section 204 being joined thereto by a screw 206 or similar fastening device to enable the upper section 204 to swivel about a longitudinal axis of the stem 202. The upper surface of the stem 202 is provided with intersecting grooves 208 while the lower surface of the upper section 204 of the stem is provided with intersecting projecting ribs 210 by which the upper section 204 can be locked in different angular positions about the axis of the screw 206. This structure is especially useful in attaching an object to the railing of a party boat or the like with the swivelling characteristic enabling the clamp to grasp a horizontal rail or a vertical rail and hold a fishing rod in desired vertical or horizontal position.

Various other uses of the clamp device are contemplated such as utilizing two of the clamp devices in back-to-back relationship in order to clampingly engage objects or entities to hold them apart such as electric conductors and the like. The clamp devices may be utilized to connect with a tubular or tapered surface such as a fishing rod, rifle barrel, rope, cable or any other similar structure for either supporting the entity engaged or be supported from the entity engaged. The stem could be provided with a mounting bracket to enable it to be supported from a flat supporting surface or the like. Also, the stem may be provided with various types of interlocking projecting studs for interlocking engagement with correspondingly shaped sockets or the like so that it is only necessary to push the projecting stud on the stem into the socket thereby providing a quick connect device and also a quick disconnect device with various arrangements being provided to releasably secure the stud in the socket.

The device may be constructed of various sizes and is preferably constructed of plastic material of various colors compatible with the use for which the clamp device is intended.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A clamp device for interconnecting two entities comprising a longitudinally extending stem, a pair of jaws connected to one end of the stem with at least one of the jaws being movable in relation to the stem and the other of the jaws, means on the stem movable into engagement with the jaws to position the jaws in connecting engagement with one of the entities, and means on the stem for connection with the other of the entities, said means engaging the jaws including an internally threaded nut mounted on an externally threaded portion of the stem and being independent of the means on the stem for connection with the other of the entities, said movable jaw being mounted on the stem with a pivot pin to enable pivotal movement of the movable jaw, said pivotal jaw including a surface extending laterally of the pivot axis of the jaw engageable by the nut to exert rotational force thereon for pivoting the movable jaw toward the other jaw, said nut having a diameter whereby the periphery of the nut is disposed outwardly at least sufficiently to be substantially in alignment with the outer edge of the laterally extending surface at its maximum lever arm relationship to said pivot pin for moving the movable jaw toward engagement with one of the entities to apply maximum torque and clamping force to the movable jaw and apply maximum locking force to the movable jaw when in clamped position.

2. The clamp device as defined in claim 1 wherein said means on the stem for connection with the other entity includes a ring-like device rigid with the end of the stem remote from the jaws with the ring-like device including a movable segment to enable the ring-like device to be connected with the other entity.

3. The clamp device as defined in claim 1 wherein both of said jaws are pivotally connected to the stem, each of said jaws including a generally flat surface oriented in aligned relation and generally perpendicular to the longitudinal axis of the stem when the jaws are engaged with one of the entities.

4. The clamp device as defined in claim 3 wherein said nut is provided with a diameter substantially greater than the diameter of the stem to enable manual rotation of the nut for use of the clamp device without tools.

5. The clamp device as defined in claim 4 wherein said means on the stem includes a pair of spaced parallel legs extending axially from the end of the stem remote from the jaws, said legs having aligned openings therethrough for receiving a pin therebetween, the space between the legs providing a space for receiving the second entity with the second entity having an aperture extending therethrough for receiving the pin for connecting the clamp device to the second entity.

6. The clamp device as defined in claim 5 wherein said pin and opening in one of the legs is provided with interlocking means to lock the pin releasably to one of the legs.

7. The clamp device as defined in claim 4 wherein said means connecting the stem to the second entity includes a plate spaced axially from the end of the stem remote from the jaws and being connected to the end of the stem by a flange centrally located transversely of the end of the stem for sliding engagement with the slotted track or anchor.

8. The clamp device as defined in claim 4 wherein said means on the stem engaged with the second entity includes a hook-like device.

9. The clamp device as defined in claim 4 wherein said means on the stem for connection with the second entity includes a D-ring pivotally connected to an extension on the stem remote from the jaws.

10. The clamp device as defined in claim 4 wherein said means on the stem for connection with the second entity includes a swivel connection incorporated into the stem to enable the pivotal axes of the jaws to be varied in angular relation about the longitudinal axis of the stem in relation to the means connecting the stem to the second entity.

11. The clamp device as defined in claim 4 together with a spring interposed between the nut and surfaces on the jaws to spring-bias the jaws towards each other to enable the jaws to releasably engage one entity and enable the one entity to be pulled from between the jaws with a predetermined force.

12. The clamp device as defined in claim 4 wherein said stem includes a transverse aperture extending therethrough, a support rod having an end portion extending through the aperture and a supporting portion extending therefrom in cantilever fashion to support a flag in extended position even with no wind when the clamp device is utilized to connect an edge of the flag to a supporting member.

13. The clamp device as defined in claim 4 wherein said jaws are provided with interdigitated fingers at their free ends.

14. The clamp device as defined in claim 4 wherein said jaws are elongated and provided with shallow concave internal surfaces provided with transverse gripping ribs.

15. The clamp device as defined in claim 4 wherein said stem includes an internally threaded bore receiving an adjustable screw member having a rounded axial projection interposed between the jaws to limit the pivotal movement thereof.

16. The clamp device as defined in claim 1 wherein three jaws are pivotally mounted on said stem for contacting one entity at at least three points around the circumference thereof.

17. A clamp device for interconnecting two entities comprising a longitudinally extending stem having an externally threaded poertion, a pair of jaws connected to one end of the stem, means on the stem movable into engagement with the jaws to position the jaws in connecting engagement with one of the entities, and means on the stem for connection with the other of the entities, said means engaging the jaws including an internally threaded nut mounted on said externally threaded portion of the stem and being rotatable independent of the means on the stem for connection with the other of the entities, said jaws being mounted on the stem with pivot pins to enable pivotal movement of the jaws, said pivotal jaws including surfaces extending laterally of the pivot axes of the jaws engageable by the nut to exert rotational force thereon for pivoting the jaws towards each other, each of said surfaces including a generally flat surface oriented in aligned relation to each other and generally perpendicular to the longitudinal axis of the stem when the jaws are engaged with one of the entities, said nut being generally in the form of a circular disc having a flat surface engaging the flat surfaces on the jaws and being provided with a diameter substantially greater than the diameter of the stem to enable manual rotation of the nut for use of the clamp device without tools, the diameter of the nut being substantially equal to the maximum distance between the edges of the flat surfaces most remote from the pivot pins to apply maximum force at maximum lever arm as the jaws are moved toward engagement with one of the entities and providing maximum locking action due to the lower flat side of the nut engaging the total surface of the flat surfaces on the jaws.

* * * * *